(12) United States Patent
Mikazuki

(10) Patent No.: US 12,630,104 B2
(45) Date of Patent: May 19, 2026

(54) IMPACT ABSORBING MEMBER

(71) Applicant: NIPPON STEEL CORPORATION, Tokyo (JP)

(72) Inventor: Yutaka Mikazuki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 454 days.

(21) Appl. No.: 18/026,283

(22) PCT Filed: Oct. 15, 2021

(86) PCT No.: PCT/JP2021/038165
§ 371 (c)(1),
(2) Date: Mar. 14, 2023

(87) PCT Pub. No.: WO2022/085575
PCT Pub. Date: Apr. 28, 2022

(65) Prior Publication Data
US 2023/0356680 A1     Nov. 9, 2023

(30) Foreign Application Priority Data
Oct. 20, 2020     (JP) ................................. 2020-175861

(51) Int. Cl.
B60R 19/34          (2006.01)

(52) U.S. Cl.
CPC .................................... B60R 19/34 (2013.01)

(58) Field of Classification Search
CPC ........................................................ F16F 7/12
USPC .......................... 293/102, 121, 122, 133, 154
See application file for complete search history.

(56) References Cited

U.S. PATENT DOCUMENTS

| | | | | |
|---|---|---|---|---|
| 8,430,437 | B2 * | 4/2013 | Asakawa | ................ B60R 19/34 293/133 |
| 9,463,758 | B2 * | 10/2016 | Tamura | ................... B60R 19/34 |
| 9,469,265 | B2 * | 10/2016 | Kamiya | ............... B60R 19/023 |
| 9,533,710 | B2 * | 1/2017 | Cheng | ................. B62D 21/152 |
| 9,889,887 | B2 * | 2/2018 | Tyan | ........................... F16F 7/12 |
| 10,300,947 | B2 * | 5/2019 | Tyan | ..................... B62D 25/04 |
| 10,393,315 | B2 * | 8/2019 | Tyan | ........................ B32B 3/12 |

(Continued)

FOREIGN PATENT DOCUMENTS

| | | |
|---|---|---|
| CN | 102730068 A | 10/2012 |
| JP | 2011-218935 A | 11/2011 |

(Continued)

*Primary Examiner* — Amy R Weisberg
*Assistant Examiner* — Veronica M Condo
(74) *Attorney, Agent, or Firm* — Birch, Stewart, Kolasch & Birch, LLP

(57)          ABSTRACT

There is provided an impact absorbing member that absorbs an impact by being crushed in an axial direction, the impact absorbing member having a cylindrical shape extending along the axial direction, in which when a cross section perpendicular to the axial direction of the impact absorbing member is set to a first cross section, and a cross section defined by extension lines of a plurality of sides in the first cross section is set to a second cross section, the second cross section is a polygon, the first cross section includes a shared vertex that is shared by the second cross section, and a recessed groove that is positioned to correspond to a vertex of the second cross section, and an interior angle of at least one vertex of the first cross section is 100° or more.

5 Claims, 9 Drawing Sheets

(56)               References Cited

U.S. PATENT DOCUMENTS

| | | | |
|---|---|---|---|
| 10,696,255 B2 * | 6/2020 | Keller | F16F 7/121 |
| 10,829,070 B2 * | 11/2020 | Tyan | B60R 21/04 |
| 2006/0181072 A1 | 8/2006 | Tamura et al. | |
| 2006/0202493 A1 | 9/2006 | Tamura et al. | |
| 2010/0102592 A1 * | 4/2010 | Tyan | B60R 19/34 |
| | | | 296/187.09 |
| 2013/0140850 A1 * | 6/2013 | Tyan | B62D 21/15 |
| | | | 296/187.03 |
| 2013/0292968 A1 | 11/2013 | Tyan et al. | |
| 2016/0001726 A1 | 1/2016 | Keller et al. | |
| 2017/0274933 A1 | 9/2017 | Tyan | |
| 2018/0057058 A1 | 3/2018 | Tyan | |
| 2019/0263343 A1 | 8/2019 | Tyan et al. | |
| 2019/0283697 A1 | 9/2019 | Tashiro et al. | |

FOREIGN PATENT DOCUMENTS

| | | | | |
|---|---|---|---|---|
| JP | 2012-166641 A | 9/2012 | | |
| JP | 2017-141860 A | 8/2017 | | |
| JP | 2018-75905 A | 5/2018 | | |
| WO | WO 2005/010397 A1 | 2/2005 | | |
| WO | WO 2005/010398 A1 | 2/2005 | | |
| WO | WO-2014073083 A1 * | 5/2014 | | F16F 7/12 |

* cited by examiner (a)

| PERSPECTIVE VIEW OF END PORTION IN AXIAL DIRECTION | SECTIONAL VIEW |
|---|---|
| (a) | CROSS SECTION OF CUTOUT PORTION |
| (b) | CROSS SECTION OF CUTOUT PORTION |
| (c) | CROSS SECTION OF HOLE PORTION |

(a) EXAMPLE 1

(b) COMPARATIVE EXAMPLE 1

(c) COMPARATIVE EXAMPLE 2

(a)

(b)

(a) EXAMPLE 4

(b) EXAMPLE 5

(c) COMPARATIVE EXAMPLE 3

IMPACT ABSORBING MEMBER

TECHNICAL FIELD

The present disclosure relates to an impact absorbing member.

BACKGROUND ART

There is known an impact absorbing member that absorbs an impact by being crushed in an axial direction. When a load is input in such an impact absorbing member in its axial direction, buckling proceeds continuously in a bellows shape in the member, to thereby absorb the impact. The impact absorbing member is arranged at a tip of a side member (a front side member or a rear side member) as a crash box in a vehicle body of an automobile, for example.

For example, Patent Document 1 discloses an impact absorbing member having a groove portion that is recessed inward of a contour, in a part of a region of at least one side of a basic cross section, at a position that is not an end point of the side. Further, Patent Document 2 discloses a die-cast aluminum alloy crash can in which a material modified portion is provided on a peripheral wall of a cylindrical portion so as to partially reduce strength against compression in a vehicle longitudinal direction. Further, Patent Document 3 discloses an impact absorbing member in which corner wall portions for forming a second closed cross section portion with a rectangular cross section extending in a longitudinal direction, in cooperation with a part of a lateral wall portion and a part of a vertical wall portion, are each provided in four corner portions of a first closed cross section portion, the corner wall portions in the four corner portions being separated from each other. Further, Patent Document 4 discloses a collision energy absorbing structure in which a cross-sectional shape of a cross section perpendicular to an axial direction is a polygonal shape that is symmetrical with respect to a center of the cross section, and is not symmetrical with respect to a center line of the cross section. In this energy absorbing structure, when an outside contour of the above-described cross section is set to a quadrangle, an aspect ratio is less than 1.5, and a ratio of lengths of adjacent sides among sides of the polygon constituting the cross section is 2.3 or less.

PRIOR ART DOCUMENT

Patent Document

Patent Document 1: International Publication Pamphlet No. WO 2005-010398
Patent Document 2: Japanese Laid-open Patent Publication No. 2012-166641
Patent Document 3: Japanese Laid-open Patent Publication No. 2017-141860
Patent Document 4: Japanese Laid-open Patent Publication No. 2011-218935

SUMMARY OF THE INVENTION

Problems to be Solved by the Invention

An impact absorbing member is required to have both impact absorbing performance and lightness in weight. The present disclosure was made in view of the above-described circumstances, and a main object thereof is to provide an impact absorbing member with good balance between the impact absorbing performance and the lightness in weight.

Means for Solving the Problems

An aspect of the present disclosure is characterized in that it is an impact absorbing member that absorbs an impact by being crushed in an axial direction, the impact absorbing member having a cylindrical shape extending along the axial direction, in which when a cross section perpendicular to the axial direction of the impact absorbing member is set to a first cross section, and a cross section defined by extension lines of a plurality of sides in the first cross section is set to a second cross section, the second cross section is a polygon, the first cross section includes a shared vertex that is shared by the second cross section, and a recessed groove that is positioned to correspond to a vertex of the second cross section, and an interior angle of at least one vertex of the first cross section is 100° or more.

According to the present disclosure, the first cross section includes the shared vertex and the recessed groove, so that it is possible to obtain an impact absorbing member with good balance between impact absorbing performance and lightness in weight (impact absorbing performance per weight).

In the above disclosure, it is also possible that the first cross section includes a plurality of the shared vertices and the recessed grooves, and the shared vertex and the recessed groove are alternately arranged along a peripheral direction of the first cross section.

In the above disclosure, it is also possible that the first cross section includes a plurality of the shared vertices and the recessed grooves, and at least two of the recessed grooves are arranged at positions corresponding to respective vertices on the same diagonal line in the second cross section. The diagonal line is the longest diagonal line out of a plurality of diagonal lines extending from one vertex.

In the above disclosure, it is also possible that lengths of adjacent sides are different in the first cross section.

In the above disclosure, it is also possible that a non-planar portion is provided to make widths of adjacent planar portions have mutually different lengths.

In the above disclosure, it is also possible that, in the first cross section, each interior angle of less than 180° is 75° or more and 135° or less, and each angle of a bottom vertex in the recessed groove is 75° or more and 135° or less.

In the above disclosure, it is also possible that the first cross section does not have a flange portion.

In the above disclosure, it is also possible that the first cross section does not have a partition wall portion in the inside thereof.

Effect of the Invention

The impact absorbing member in the present disclosure brings about an effect of providing a good balance between the impact absorbing performance and the lightness in weight.

BRIEF DESCRIPTION OF THE DRAWINGS

FIGS. 7(*a*) to 7(*c*) are schematic perspective views and schematic sectional views exemplifying impact absorbing members in the present disclosure.

EMBODIMENTS FOR CARRYING OUT INVENTION

Hereinafter, impact absorbing members in the present disclosure will be described in detail. In respective drawings to be shown below, a size and a shape of each part are appropriately exaggerated for easier understanding. Further, in the respective drawings, hatching or codes are sometimes omitted for the sake of convenience.

Further, when expressing an aspect in which, with respect to a certain member, another member is arranged, an aspect of a case described that the other member is arranged "on" or "under" the certain member, includes both an aspect in which the other member is arranged directly on or directly under the certain member so as to be brought into contact with the certain member, and an aspect in which the other member is arranged above or below the certain member with a different member provided therebetween.

Figure 1:
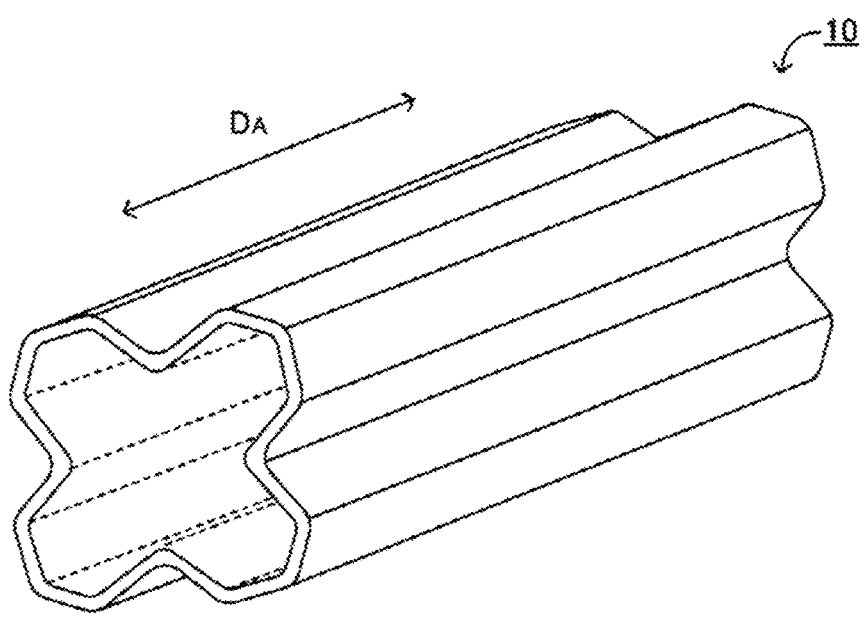
FIG. 1 is a schematic perspective view exemplifying an impact absorbing member in the present disclosure.
Figure 2:
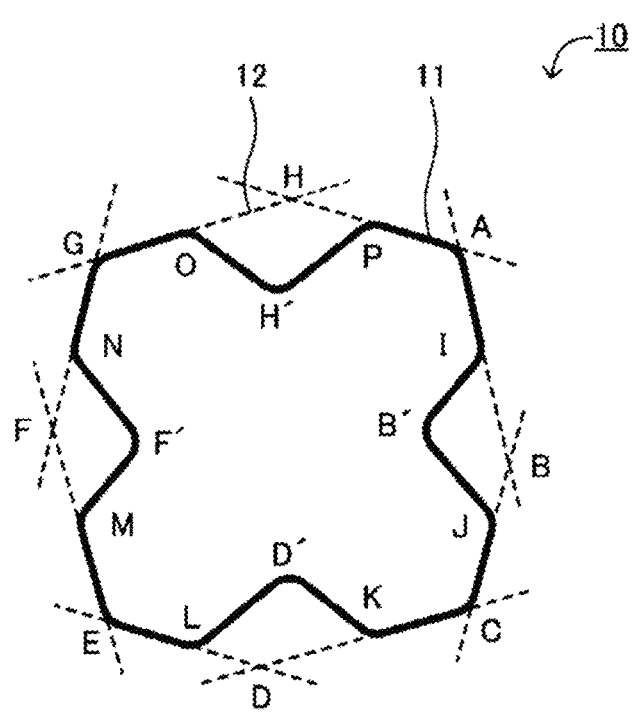
FIG. 2 is a schematic sectional view exemplifying the impact absorbing member in the present disclosure.

FIG. 1 is a schematic perspective view exemplifying an impact absorbing member in the present disclosure. FIG. 2 is a schematic sectional view exemplifying the impact absorbing member in the present disclosure, and concretely, it corresponds to a sectional view illustrating a cut surface perpendicular to an axial direction DA in FIG. 1. An impact absorbing member 10 illustrated in FIG. 1 absorbs an impact by being crushed in the axial direction DA. The impact absorbing member 10 has a cylindrical shape extending along the axial direction DA. Further, as illustrated in FIG. 2, a cross section perpendicular to the axial direction DA of the impact absorbing member 10 is set to a first cross section 11. In FIG. 2, the first cross section 11 is a cross section described by a thick solid line. On the other hand, a cross section defined by extension lines of a plurality of sides (line segments connecting vertices) in the first cross section 11 is set to a second cross section 12. In FIG. 2, the second cross section 12 is a cross section described by a dotted line.

As illustrated in FIG. 2, the second cross section 12 is a polygon. Concretely, the second cross section 12 is an octagon having eight vertices of a vertex A to a vertex H, along a peripheral direction. The first cross section 11 includes shared vertices that are shared by the second cross section 12. In FIG. 2, the first cross section 11 and the second cross section 12 share the vertices A, C, E, and G, and these vertices correspond to the shared vertices. On the other hand, the first cross section 11 and the second cross section 12 do not share the vertices B, D, F, and H. The first cross section 11 includes recessed grooves so as to stride over the vertices B, D, F, and H. These recessed grooves have vertices B' D', F', and H' at bottoms, respectively.

According to the present disclosure, since the first cross section includes the shared vertices and the recessed grooves, it is possible to obtain an impact absorbing member with good balance between impact absorbing performance and lightness in weight (impact absorbing performance per weight).

Figure 3:
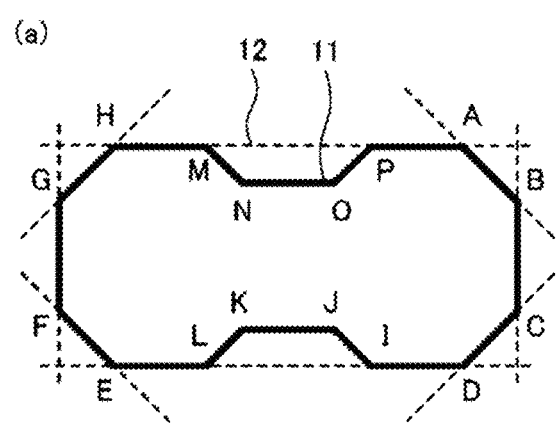
FIGS. 3(a) to 3(d) are schematic sectional views each exemplifying a conventional impact absorbing member.
Figure 3:
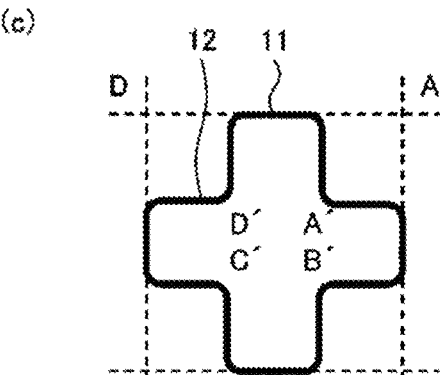
Figure 3:
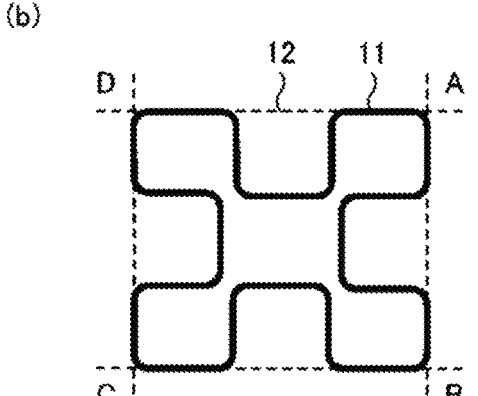
Figure 3:
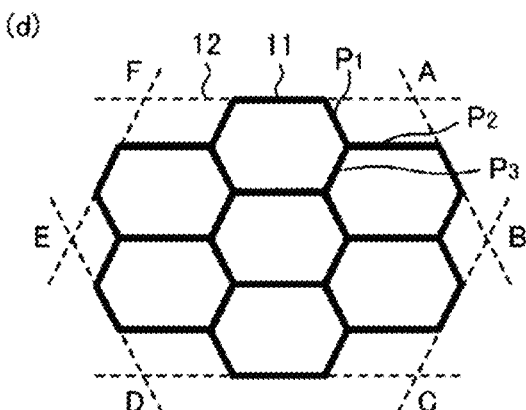

Differences with respect to conventional impact absorbing members will be described by using FIG. 3. FIG. 3(*a*) illustrates a cross section corresponding to FIG. 3 of Patent Document 1. A first cross section 11 illustrated in FIG. 3(*a*) has recessed grooves at a part of a side HA and a part of a side DE, respectively, in a second cross section 12. For example, the side HA is divided into a side HM and a side PA by the recessed groove, and these sides are on the same straight line. When considering an axial direction, a planar portion including the side HM and a planar portion including the side PA are on the same plane. For this reason, there is room for improvement regarding the balance between the impact absorbing performance and the lightness in weight.

Further, FIG. 3(*b*) is a cross section studied in a comparative example 2 to be described later, in which two sides divided by a recessed groove are on the same straight line, in a similar manner to FIG. 3(*a*), and thus there is room for improvement regarding the balance between the impact absorbing performance and the lightness in weight.

On the contrary, the first cross section in the present disclosure includes the recessed groove positioned so as to correspond to the vertex of the second cross section. Two sides divided by such a recessed groove are not on the same straight line, unlike FIGS. 3(*a*) and 3(*b*). For example, in FIG. 2, the recessed groove having, at the bottom, the vertex B' corresponding to the vertex B, divides a side AC into a side AI and a side JC, and these sides are not on the same straight line. When considering the axial direction, a planar portion including the side AI and a planar portion including the side JC are not on the same plane. Accordingly, it is possible to improve the balance between the impact absorbing performance and the lightness in weight.

FIG. 3(*c*) is a cross section corresponding to FIG. 3 of Patent Document 2. A first cross section 11 illustrated in FIG. 3(*c*) has recessed grooves at all vertices (vertices A to D), respectively, in a second cross section 12. Specifically, the first cross section 11 illustrated in FIG. 3(*c*) does not have a shared vertex that is shared by the second cross section 12. The shared vertex becomes a major resistance portion when a bending stress occurs on the impact absorbing member in the axial direction. For this reason, when the first cross section does not have the shared vertex, the resistance with respect to the bending stress is weak. On the contrary, since the first cross section in the present disclosure has the shared vertex, the resistance with respect to the bending stress is high, which is advantageous.

Further, FIG. 3(*d*) illustrates a cross section having a honeycomb structure, in which a first cross section 11 does not have a shared vertex that is shared by a second cross section 12, in a similar manner to FIG. 3(*c*). Accordingly, the resistance with respect to the bending stress is low. Further, the first cross section 11 illustrated in FIG. 3(*d*) has a partition wall portion in the inside thereof. In the axial direction, a strong joining structure is formed by planar portions $P_1$ and $P_2$ configuring an outer edge of the first cross section 11, and a planar portion P3 configuring the partition wall portion, and when this joining structure works as a resistance, the balance between the impact absorbing performance and the lightness in weight is improved. However, when crushing in the axial direction occurs, a high stress is applied to the joining structure, so that in order to avoid breakage of the joining structure under the stress, complicated measures have to be taken. On the contrary, the impact absorbing member in the present disclosure has an advantageous point that the balance between the impact absorbing performance and the lightness in weight is good even if the first cross section does not have the partition wall portion in the inside thereof.

Hereinafter, the impact absorbing member in the present disclosure will be described more specifically.

In the present disclosure, the cross section perpendicular to the axial direction of the impact absorbing member is defined as the first cross section. As illustrated in FIG. 1 and FIG. 2, the first cross section 11 is a cross section obtained when cutting the impact absorbing member 10 having the cylindrical shape, at a plane in which the axial direction DA is set to a normal direction, and the first cross section 11 is normally a closed cross section defined by an outer edge of the cylindrical shape.

Meanwhile, in the present disclosure, the cross section defined by the extension lines of the plurality of sides in the first cross section, is defined as the second cross section. Concretely, as illustrated in FIG. 2, the cross section defined by the extension lines of the plurality of sides (the side AI, the side JC, a side CK, a side LE, a side EM, a side NG, a side GO, and a side PA) in the first cross section 11, is defined as the second cross section 12. The number of the plurality of sides is set to the maximum number capable of configuring the second cross section 12. For example, in FIG. 2, if the side AI, the side CK, the side EM, and the side GO are employed as the plurality of sides that configure the second cross section 12, a large quadrangle is defined by extension lines of those sides, but the quadrangle does not correspond to the second cross section 12 (because the other sides such as the side JC are not taken into consideration). Further, the second cross section 12 is defined so as not to have an interior angle of 180° or more. For example, when a side IB' and a side B'J are employed as the plurality of sides that configure the second cross section 12, a figure having a vertex B' is defined, but the figure does not correspond to the second cross section 12 (because an interior angle of the vertex B' is 180° or more). The second cross section 12 is normally defined so as to surround an outer edge of the first cross section 11.

In the present disclosure, the second cross section is a polygon. The second cross section may be a 2n-sided polygon (n is an integer of 2 or more) such as a quadrangle, and it may also be a 2n+1-sided polygon (n is an integer of 1 or more) such as a triangle. The former has a high symmetric property as a figure, and thus it is possible to obtain an impact absorbing member with uniform resistance with respect to a bending stress in the axial direction. Such an impact absorbing member is useful as a member required to be resistant to an impact (bending stress) from an arbitrary direction, for example. When compared to the former, the latter has a low symmetric property as a figure, and thus there is obtained an impact absorbing member whose resistance with respect to the bending stress is nonuniform in the axial direction. Such an impact absorbing member is useful as a member required to be resistant to an impact (bending stress) from a specific direction, for example. n is not limited in particular, and it may be 2 or more, 3 or more, or 4 or more. On the other hand, n is 10 or less, for example.

Figure 4:
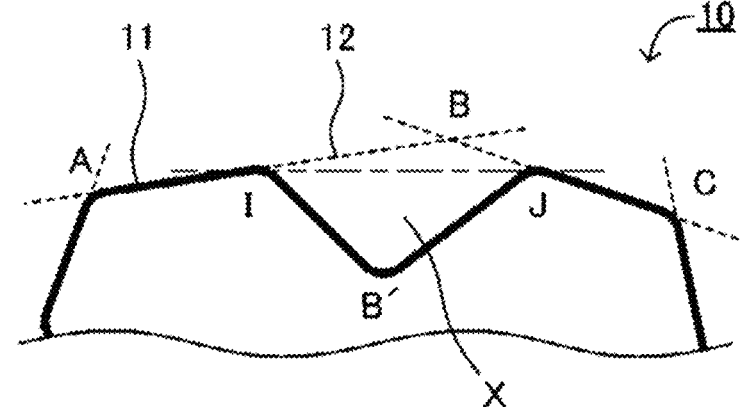
FIG. 4 is a schematic sectional view exemplifying the impact absorbing member in the present disclosure.

FIG. 4 is a schematic sectional view exemplifying the impact absorbing member in the present disclosure, and illustrates a part of the first cross section 11 and the second cross section 12 in FIG. 2. In FIG. 4, the first cross section 11 includes shared vertices (vertices A and C) that are shared by the second cross section 12. Meanwhile, the first cross section 11 includes a recessed groove X positioned so as to correspond to a vertex of the second cross section 12. Whether the first cross section 11 includes the recessed groove X, is judged by the following procedure.

First, out of vertices of the second cross section, a vertex that is not shared by the first cross section (non-shared vertex) is specified. In FIG. 4, a vertex B corresponds to the non-shared vertex. Next, a boundary point that exists at the midpoint of a side connecting the non-shared vertex and the shared vertex, and that is a boundary deciding whether or not the first cross section and the second cross section share the side (a boundary vertex of the first cross section) is specified. In FIG. 4, each of a vertex I of the first cross section that exists at the midpoint of a side BA, and a vertex J of the first cross section that exists at the midpoint of a side BC, corresponds to the boundary vertex. At last, a straight line connecting the two boundary vertices and striding over the non-shared vertex is supposed, and when the first cross section has an inflection point (inflection vertex) on the side being the inner side of an outer edge of the second cross section (on the opposite side of the non-shared vertex) relative to the straight line, it is judged that the first cross section includes the recessed groove. In FIG. 4, a straight line IJ connecting the vertex I and the vertex J being the boundary vertices is supposed, and since the first cross section 11 has an inflection vertex (the vertex B') on the side being the inner side of an outer edge of the second cross section 12 (on the opposite side of the vertex B being the non-shared vertex) relative to the straight line IJ, it is judged that the first cross section 11 includes the recessed groove X. The recessed groove X may have only one inflection vertex or a plurality of inflection vertices. Note that the inflection vertex can also be referred to as a bottom vertex of the recessed groove X.

The first cross section may include only one shared vertex described above, or it may also include a plurality of the shared vertices. In a similar manner, the first cross section may include only one recessed groove described above, or it may also include a plurality of the recessed grooves. The number of the shared vertex and the recessed groove can be combined in an arbitrary manner. Further, as illustrated in FIG. 2, the shared vertex and the recessed groove are preferably arranged alternately along a peripheral direction of the first cross section 11. This is for making buckling proceed stably. When the second cross section 12 is a 2n-sided polygon (n is an integer of 2 or more, and in FIG. 2, the section is an octagon), the shared vertices and the recessed grooves are arranged not in a manner that the shared vertices or the recessed grooves are continuously arranged along the peripheral direction, but in a manner that the shared vertex and the recessed groove are alternately arranged along the peripheral direction. Further, although not illustrated, when the second cross section 12 is a 2n+1-sided polygon (n is an integer of 1 or more), there is generated a continuous portion in which the shared vertices or the recessed grooves are continuously arranged in the peripheral direction, and except for the continuous portion, the shared vertex and the recessed groove are alternately arranged.

Figure 5:
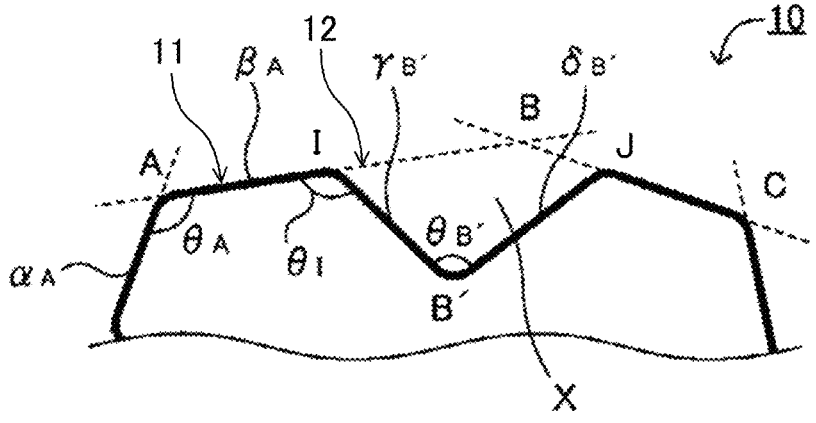
FIG. 5 is a schematic sectional view exemplifying the impact absorbing member in the present disclosure.

FIG. 5 is a schematic sectional view exemplifying the impact absorbing member in the present disclosure, and illustrates a part of the first cross section 11 and the second cross section 12 in FIG. 2. In the impact absorbing member 10, an interior angle of at least one vertex out of interior angles of the vertices of the first cross section 11 is 100° or more. As will be described later in examples, if the interior angle of at least one vertex of the first cross section 11 is 100° or more, the resistance force with respect to the bending stress is further improved, when compared to a case where the interior angle of the vertex is 90° or less.

Further, as long as the interior angle of at least one vertex of the first cross section 11 is 100° or more, angles of interior angles of the other vertices are not limited in particular. Here, as illustrated in FIG. 5, an interior angle of the vertex B' being the bottom vertex normally becomes 180° or more, so that for the sake of convenience, a case where such an interior angle is not taken into consideration, is supposed. In this case, an angle of an interior angle of less than 180° at the vertex of the first cross section, except for the vertex having the interior angle of 100° or more described above, is 75° or more, for example, it may be 90° or more, and it may also be 105° or more. Note that the interior angle of at least one vertex of the first cross section 11 may be 105° or more, and it may also be 110° or more.

When the axial direction is taken into consideration, the interior angle in the first cross section corresponds to a ridge line angle of adjacent planar portions. When the ridge line angle of the adjacent planar portions is equal to or more than a proper angle determined according to a shape, a sheet thickness, and the like of the impact absorbing member, a phase shift is likely to occur in out-of-plane deformations of the adjacent planar portions at a time of crushing in the axial direction. Accordingly, the out-of-plane deformations of the mutual planar portions with different phases interfere with each other, and in accordance with this, the resistance of each planar portion is increased, resulting in that the balance between the impact absorbing performance and the lightness in weight is likely to be improved.

On the other hand, an angle of an interior angle of less than 180° (for example, an interior angle $\theta_A$ and an interior angle $\theta_I$ illustrated in FIG. 5) in the first cross section is 135° or less, for example, and is preferably 130° or less. The interior angle in the first cross section corresponds to a ridge line angle of adjacent planar portions of the impact absorbing member 10, and if the angle of the interior angle (the ridge line angle of the adjacent planar portions) is within the above-described range, the stability of buckling can be improved. Further, all interior angles of less than 180° in the first cross section are preferably within the above-described range.

An angle of an exterior angle of the bottom vertex in the recessed groove (for example, an exterior angle $\theta_{B'}$ illustrated in FIG. 5) is not limited in particular. The angle of the exterior angle of the bottom vertex is 75° or more, for example, it may be 90° or more, and it may also be 105° or more. The angle of the bottom vertex also corresponds to a ridge line angle of adjacent planar portions, in a similar manner to the interior angle in the first cross section. For this reason, when the ridge line angle of the adjacent planar portions is equal to or more than a proper angle determined according to a shape, a sheet thickness, and the like of the impact absorbing member, out-of-plane deformations with different phases interfere with each other, resulting in that the resistance of the planar portions is likely to be increased.

On the other hand, the angle of the bottom vertex is 135° or less, for example, and it may be 130° or less. This makes it possible to increase the stability of buckling. Further, angles of all bottom vertices in the recessed grooves are preferably within the above-described range.

In the first cross section 11, lengths of adjacent sides are preferably different from each other. This is for improving the stability of buckling. Here, when the axial direction is taken into consideration, the side in the first cross section 11 corresponds to a width of a planar portion. Different lengths of the adjacent sides mean different widths of the adjacent planar portions. When the widths of the adjacent planar portions are different, a phase shift is likely to occur in out-of-plane deformations of the adjacent planar portions at a time of crushing in the axial direction. When, due to the phase shift, the buckling of the adjacent planar portions occurs in opposite phases, the buckling proceeds in a stable manner. The description of "lengths are different" means that an absolute value of a difference in lengths of both sides is 0.5 mm or more, the absolute value may be 1.0 mm or more, and it may also be 2.0 mm or more. On the other hand, the absolute value of the difference in lengths of the both sides is 2.0 cm or less, for example. Further, in the first cross section 11, the lengths of the adjacent sides may be the same. The description of "lengths are the same" means that the absolute value of the difference in lengths of the both sides is less than 0.5 mm.

The description of "the lengths of the adjacent sides are different in the first cross section" can be classified into several aspects. As concrete examples, there can be cited (i) an aspect in which lengths of two sides configuring a shared vertex are different, (ii) an aspect in which lengths of two sides configuring a bottom vertex are different, and (iii) an aspect in which lengths of two sides configuring a boundary vertex are different. The first cross section preferably satisfies at least one of (i) to (iii). This is for improving the stability of buckling.

The aspects of (i) to (iii) will be described by using FIG. 5. In FIG. 5, the vertex A being the shared vertex is configured by a side $\alpha_A$ and a side $\beta_A$, the vertex B' being the bottom vertex in the recessed groove X is configured by a side $\gamma_{B'}$ and a side $\delta_{B'}$, and the vertex I being the boundary vertex is configured by the side $\beta_A$ and the side $\gamma_{B'}$. The aspect of (i) corresponds to an aspect in which lengths of the side $\alpha_A$ and the side $\beta_A$ are different, the aspect of (ii) corresponds to an aspect in which lengths of the side $\gamma_{B'}$ and the side $\delta_{B'}$ are different, and the aspect of (iii) corresponds to an aspect in which lengths of the side $\beta_A$ and the side $\gamma_{B'}$ are different.

In the present disclosure, it is preferable that the side length is increased and reduced in a repeated manner along the peripheral direction of the first cross section. For example, in FIG. 5, a side AI, a side IB', a side B'J, and a side JC are arranged along the peripheral direction of the first cross section 11, in which the side IB' is shorter than the side AI, the side B'J is longer than the side IB', and the side JC is shorter than the side B'J, along the peripheral direction of the first cross section 11. In particular, a case is supposed in which the first cross section is a 2n-sided polygon (n is an integer of 2 or more), and has sides from a first side to a 2n-th side along the peripheral direction. When a second side is longer than the first side, it is preferable that a 2m-1-th side (m=2 to n) is shorter than a 2m-2-th side, a 2m-th side is longer than the 2m-1-th side, and the first side is shorter than the 2n-th side. On the contrary, when the second side is shorter than the first side, it is preferable that the 2m-1-th side (m=2 to n) is longer than the 2m-2-th side, the 2m-th side is shorter than the 2m-1-th side, and the first side is longer than the 2n-th side. Further, each length of the 2m-1-th side (m=2 to n) may be the same as the length of the first side, and each length of the 2m-th side (m=2 to n) may be the same as the length of the second side. Note that in an example 1 to be described later, a first cross section is a hexadecagon, and a side length is increased and reduced ($Wp_1$, $Wp_2$) in a repeated manner along a peripheral direction of the first cross section, as illustrated in FIG. 8(a).

Further, when the first cross section is a 2n-sided polygon (n is an integer of 2 or more), and besides, a long side L (a width Wm of a planar portion) and a short side S (a width $Wp_2$ of a planar portion) are alternately arranged along the peripheral direction, the following condition (1) is preferably satisfied.

$$1.01 < L/S \qquad (1)$$

In the impact absorbing member satisfying the above condition (1), even if a high-strength steel sheet is used as a material, the above-described phase shift is likely to occur in the out-of-plane deformations of the adjacent planar portions at the time of crushing in the axial direction. When, due to the phase shift, the buckling of the adjacent planar portions occurs in opposite phases, the buckling is likely to proceed in a stable manner. Note that the length of the side (the width of the planar portion) in the present description indicates a length from an R-end (a boundary between a curved line and a straight line in a cross section) of one ridge line portion out of two ridge line portions sandwiching one planar portion, to an R-end of the other ridge line portion.

In the present disclosure, the first cross section may not have a flange portion. When the first cross section does not have the flange portion, it is possible to suppress a disturbance of buckling (deformation) caused by the flange portion. The flange portion indicates a portion provided to project toward the outside from an outer edge of the first cross section. Note that as a conventional impact absorbing member, there is known one as disclosed in Japanese Laid-open Patent Publication No. H8-128487, for example, in which flange portions provided to a member having a hat-shaped cross section and a back sheet are welded, to thereby obtain a box-shaped member.

In the present disclosure, the first cross section may not have a partition wall portion in the inside thereof. As explained by using FIG. 3(d) described above, by providing the partition wall portion, a strong joining structure is formed, and when this joining structure works as a resistance, the balance between the impact absorbing performance and the lightness in weight is improved. However, when crushing in the axial direction occurs, a high stress is applied to the joining structure, so that in order to avoid breakage of the joining structure under the stress, complicated measures have to be taken. On the contrary, the impact absorbing member in the present disclosure has an advantageous point that the balance between the impact absorbing performance and the lightness in weight is good even if the first cross section does not have the partition wall portion in the inside thereof.

Figure 6:
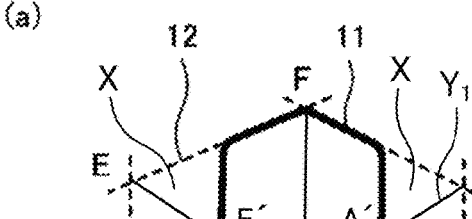
FIGS. 6(*a*) to 6(*d*) are schematic sectional views each exemplifying an impact absorbing member in the present disclosure.
Figure 6:
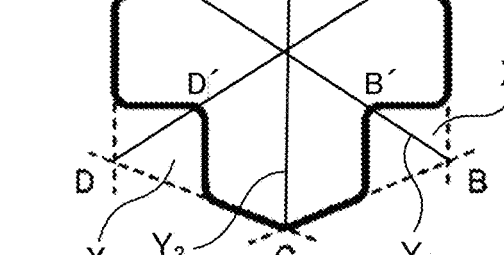
Figure 6:
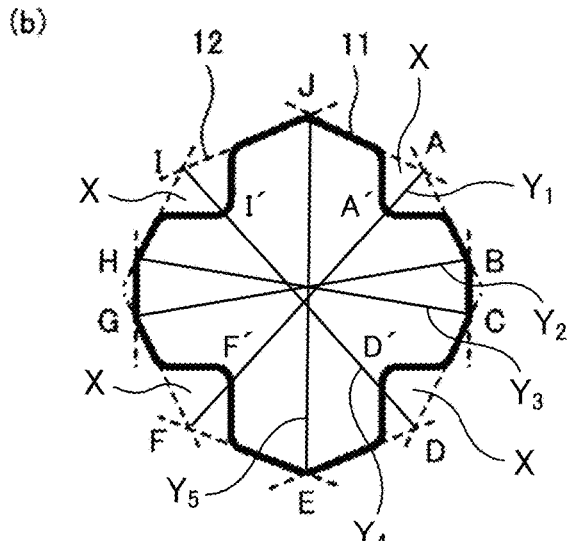
Figure 6:
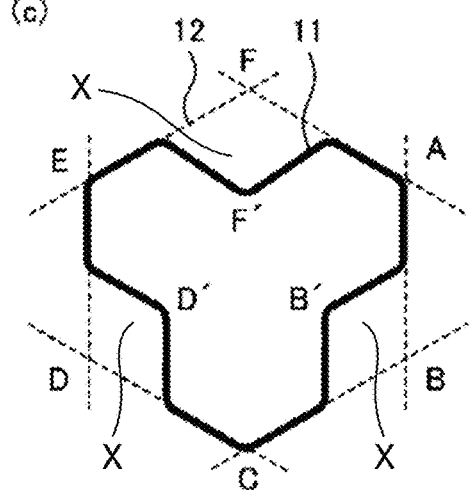
Figure 6:
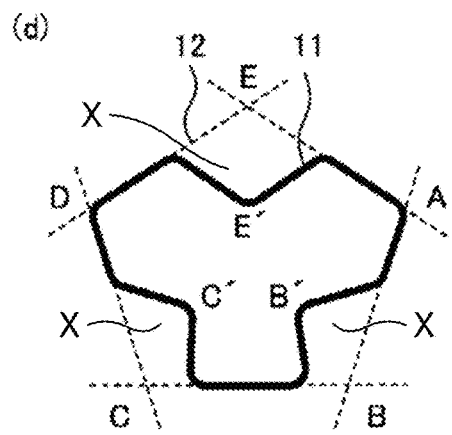

FIG. 6 are schematic sectional views each exemplifying an impact absorbing member in the present disclosure. In FIG. 6(a), a second cross section 12 is a hexagon having six vertices from a vertex A to a vertex F along a peripheral direction. A first cross section 11 and the second cross section 12 share the vertices C and F, and these vertices correspond to shared vertices. On the other hand, the first cross section 11 and the second cross section 12 do not share the vertices A, B, D, and E. The first cross section 11 includes recessed grooves X so as to stride over the vertices A, B, D, and E. These recessed grooves X have vertices A', B', D', and E' at their bottoms, respectively. As illustrated in FIG. 6(a), the number of the shared vertices may be smaller than the number of the recessed grooves X.

Note that at least two recessed grooves X are preferably arranged at positions corresponding to respective vertices positioned on the same diagonal line in the second cross section 12. The diagonal line in this case is the longest diagonal line out of a plurality of diagonal lines extending from one vertex (referred to as the "longest diagonal line", hereinafter). With the use of such an impact absorbing member, a symmetric property of arrangement between the shared vertices and the recessed grooves is enhanced, which improves the stability of buckling. In the example illustrated in FIG. 6(a), as the longest diagonal lines, there are three longest diagonal lines of a diagonal line $Y_1$ extending from the vertex A, a diagonal line $Y_2$ extending from the vertex B, and a diagonal line $Y_3$ extending from the vertex C. Further, the recessed grooves X are arranged at positions corresponding to respective vertices of the vertices A and D being end points of the diagonal line $Y_1$, and at positions corresponding to respective vertices of the vertices B and E being end points of the diagonal line Yz.

In FIG. 6(b), a second cross section 12 is a decagon having ten vertices from a vertex A to a vertex J along a peripheral direction. A first cross section 11 and the second cross section 12 share the vertices B, C, E, G, H, and J, and these vertices correspond to shared vertices. On the other hand, the first cross section 11 and the second cross section 12 do not share the vertices A, D, F, and I. The first cross section 11 includes recessed grooves X so as to stride over the vertices A, D, F, and I. These recessed grooves X have vertices A', D', F', and I' at their bottoms, respectively. As illustrated in FIG. 6(b), the number of the shared vertices may be larger than the number of the recessed grooves X. Further, in the example illustrated in FIG. 6(b), there are four diagonal lines $Y_1$ to $Y_5$ as the longest diagonal lines, and the recessed grooves X are arranged at positions corresponding to respective vertices of the vertices A and F being end points of the diagonal line $Y_1$, and at positions corresponding to respective vertices of the vertices D and I being end points of the diagonal line $Y_4$.

Further, in FIG. 6(c), a second cross section 12 is a hexagon having six vertices from a vertex A to a vertex F along a peripheral direction. A first cross section 11 and the second cross section 12 share the vertices A, C, and E, and these vertices correspond to shared vertices. On the other hand, the first cross section 11 and the second cross section 12 do not share the vertices B, D, and F. The first cross section 11 includes recessed grooves X so as to stride over the vertices B, D, and F. These recessed grooves X have vertices B', D', and F' at their bottoms, respectively. As illustrated in FIG. 6(c), the number of the shared vertices may be the same as the number of the recessed grooves X.

Further, in FIG. 6(d), a second cross section 12 is a pentagon having five vertices from a vertex A to a vertex E along a peripheral direction. A first cross section 11 and the second cross section 12 share the vertices A and D, and these vertices correspond to shared vertices. On the other hand, the first cross section 11 and the second cross section 12 do not share the vertices B, C, and E. The first cross section 11 includes recessed grooves X so as to stride over the vertices B, C, and E. These recessed grooves X have vertices B', D', and F' at their bottoms, respectively.

The impact absorbing member according to the present disclosure may be provided with a non-planar portion so that lengths of adjacent planar portions become different from each other. With the use of such an impact absorbing member having the non-planar portion, the stability of buckling that may occur when a load in an axial direction is input, is improved, in a similar manner to the above-described case where the lengths of the adjacent sides in the first cross section are different. Further, in order to enhance this effect, the relationship regarding the lengths of the adjacent planar portions preferably satisfies the above-described condition (1).

The non-planar portion indicates a portion at which a material within a plane of the planar portion configuring the impact absorbing member is not continued, or a portion recessed inward or a portion projecting outward with respect to the planar portion. As examples of the non-planar portion at which the material is not continued, there can be cited an opening such as a circular hole or a long hole, and a cutout. Further, as examples of the non-planar portion that is recessed inward or the non-planar portion that projects outward with respect to the planar portion, there can be cited a recessed bead that is recessed inward with respect to the planar portion, a projecting bead that projects outward with respect to the planar portion, or an embossed portion that is recessed or projected through embossing. A concrete shape of the non-planar portion is not limited in particular. When the non-planar portion is a hole, for example, it may be a circular hole or a square hole. Further, when the non-planar portion is a bead, it may be a circular bead or a square bead.

Note that the width of the planar portion of the impact absorbing member having the non-planar portion is, when the planar portion is sandwiched between a ridge line portion and the non-planar portion, a length from an R-end of the ridge line portion to the non-planar portion. Further, when the planar portion is sandwiched between two non-planar portions, a length from one of the non-planar portions to the other non-planar portion, corresponds to the width of the planar portion.

Here, examples of the shape and examples of the arrangement of the above-described non-planar portion will be described while referring to FIG. 7. FIG. 7 are perspective views each illustrating an end portion in the axial direction of an impact absorbing member having non-planar portions, and schematic views each illustrating a cross section obtained by cutting the end portion in the axial direction of the impact absorbing member, in a direction perpendicular to the axial direction. In the example illustrated in FIG. 7($a$), cutouts are formed as a plurality of non-planar portions 13, on planar portions at the end portion in the axial direction of an impact absorbing member 10. In the example illustrated in FIG. 7($b$), cutouts each having a width wider than that of the cutout illustrated in FIG. 7($a$), are formed as a plurality of non-planar portions 13. FIG. 7($c$) illustrates the example in which cutouts and long holes are formed as non-planar portions 13. The long hole is formed on a planar portion that is different from a planar portion on which the cutout is provided, and further, a formation position of the long hole and a formation position of the cutout in the axial direction are different from each other.

As a material of the impact absorbing member in the present disclosure, there can be cited metal such as steel or an aluminum alloy, for example. Further, tensile strength of the above metal is preferably 780 MPa or more, for example. The tensile strength is more preferably 980 MPa or more, and still more preferably 1180 MPa or more. Further, although a sheet thickness of the impact absorbing member is not limited in particular, it is 0.5 mm or more and 5 mm or less, for example, and it may also be 0.5 mm or more and 1.6 mm or less. The material of 780 MPa or more is advantageous in terms of impact absorbing performance, but there is room for improvement in terms of suppressing the reduction in stability of deformation due to a fracture of the material. It has been found out that the fracture is caused by bending deformation, and regarding a strain amount generated by bending deformation at the same curvature radius, the thinner the sheet thickness is, the more advantageous it is. Based on this point of view, the sheet thickness of the impact absorbing member is preferably 1.6 mm or less. Further, although the impact absorbing member can be used for arbitrary purposes for absorbing an impact through crushing in the axial direction, there can be cited a crash box for an automobile, as a typical application thereof.

Although a manufacturing method of the impact absorbing member in the present disclosure is not limited in particular, there can be cited, for example, a method of applying, to a raw material having a cylindrical shape, any one or a plurality of pieces of processing such as extrusion, hydroforming (liquid seal forming), and roll forming. As another example of the manufacturing method of the impact absorbing member, there can be cited a method of applying, to a steel sheet, any one or a plurality of pieces of processing such as press bending, drawing, winding, and roll forming, to thereby form a cylindrical shape having a first cross section. In order to make the cylindrical shape into a closed cross section, joining may be performed appropriately. As joining methods, there can be cited, for example, intermittent joining such as spot welding, caulking, and spot friction stir welding, and continuous joining such as arc (plasma) welding, laser welding, and friction stir welding.

The present disclosure is not limited to the above-described embodiments. The above-described embodiments are provided as examples, and any embodiment shall be included in the technical scope in the present disclosure, provided that such an embodiment has a configuration that is substantially the same as the technical ideas described in claims in the present disclosure, and that the embodiment brings about similar functions and effects.

EXAMPLES

Example 1

A FEM analysis was performed to evaluate buckling deformation behavior. In an example 1, buckling deformation behavior in an impact absorbing member having a first cross section illustrated in FIG. 8($a$) was evaluated. In the first cross section illustrated in FIG. 8($a$), as a width Wp of a planar portion P extending in the axial direction (a side configuring the first cross section), $Wp_1$ (11 mm) and $Wp_2$ (9 mm) were set. Note that although not illustrated, a second cross section in the impact absorbing member illustrated in FIG. 8($a$) is an octagon, in a similar manner to FIG. 2. Further, all interior angles (ridge line angles) of less than 180° in the first cross section were set to $\theta_1 = 120°$, and besides, all angles (ridge line angles) of bottom vertices of four recessed grooves were set to $\theta_2 = 90°$. Further, a curvature radius of ridge line Rr was set to 5 mm, and a length in the axial direction was set to 200 mm. For the FEM analysis, a material property of a 1180 MPa-class steel sheet with a sheet thickness of 1.0 mm was used, strain rate dependence was taken into account based on the Cowper-Symonds model, and a deformation rate (collision rate) at a time of buckling deformation was set to 5 m/s.

Comparative Example 1

Figure 8:
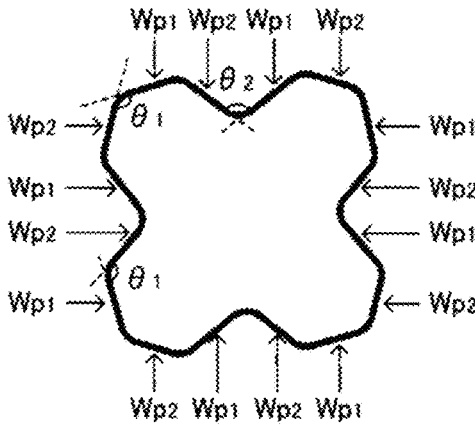
FIGS. 8(*a*) to 8(*c*) are schematic sectional views exemplifying impact absorbing members in an example 1 and comparative examples 1 and 2, respectively.
Figure 8:
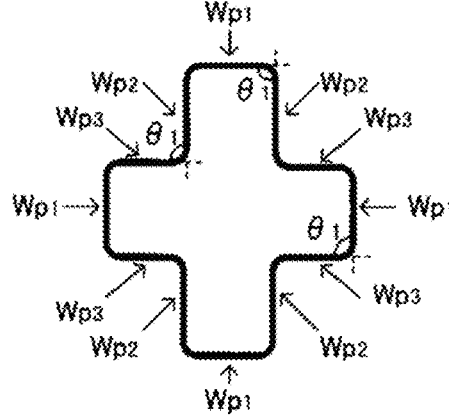
Figure 8:
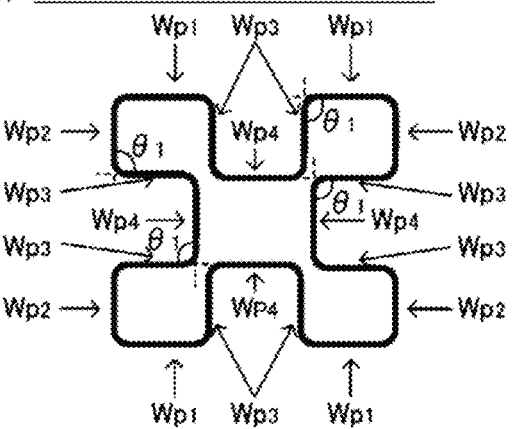

In a comparative example 1, buckling deformation behavior in an impact absorbing member having a first cross section illustrated in FIG. 8(*b*) was evaluated. In the first cross section illustrated in FIG. 8(*b*), as a width Wp of a planar portion P extending in the axial direction, $Wp_1$ (10 mm), $Wp_2$ (12 mm), and $Wp_3$ (8 mm) were set. Further, all interior angles (ridge line angles) of less than 180° in the first cross section were set to $\theta1=90°$, and besides, all angles (ridge line angles) of bottom vertices of four recessed grooves were also set to $\theta_1=90°$. The other conditions were set in a similar manner to the example 1.

Comparative Example 2

In a comparative example 2, buckling deformation behavior in an impact absorbing member having a first cross section illustrated in FIG. 8(*c*) was evaluated. In the first cross section illustrated in FIG. 8(*c*), as a width Wp of a planar portion P extending in the axial direction, $Wp_1$ (12 mm), $Wp_2$ (8 mm), $Wp_3$ (9 mm), and $Wp_4$ (12 mm) were set. Further, all interior angles (ridge line angles) of less than 180° in the first cross section were set to $\theta1=90°$, and besides, all angles (ridge line angles) of bottom vertices of four recessed grooves were also set to $\theta1=90°$. The other conditions were set in a similar manner to the example 1. The set conditions of the example 1 and the comparative examples 1 and 2 are shown in Table 1.

TABLE 1

|  |  | EXAMPLE 1 | COMPARATIVE EXAMPLE 1 | COMPARATIVE EXAMPLE 2 |
|---|---|---|---|---|
| RIDGE LINE | $\theta_1$ | 120 deg. | 90 deg. | 90 deg. |
| ANGLE | $\theta_2$ | 90 deg. | — | — |
| WIDTH OF | $Wp_1$ | 11 mm | 10 mm | 12 mm |
| PLANAR | $Wp_2$ | 9 mm | 12 mm | 8 mm |
| PORTION | $Wp_3$ | — | 8 mm | 9 mm |
|  | $Wp_4$ | — | — | 12 mm |
| CURVATURE RADIUS OF RIDGE LINE Rr |  | 5 mm | | |
| SHEET THICKNESS t |  | 1.0 mm | | |
| MATERIAL |  | 1180 MPa-CLASS | | |
| LENGTH H |  | 200 mm | | |
| COLLISION RATE |  | 5 m/s | | |

[Evaluation]

Figure 9:
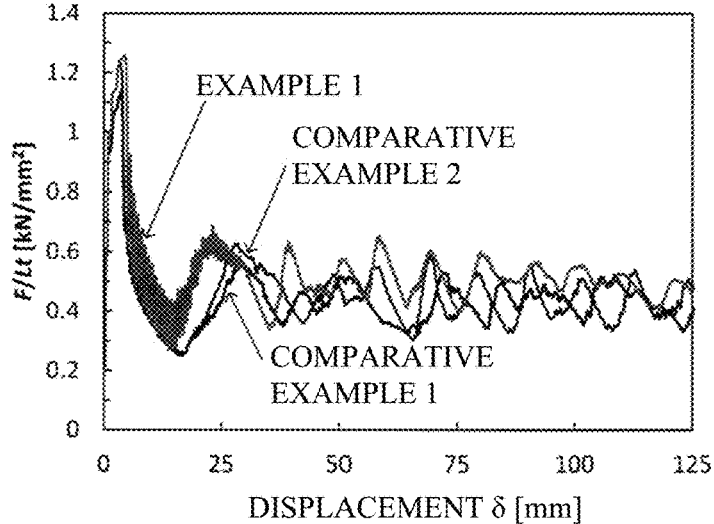
FIG. 9 is a result of FEM analysis in the example 1 and the comparative examples 1 and 2.

Results of the FEM analysis in the example 1 and the comparative examples 1 and 2 are shown in FIG. 9. In FIG. 9, a horizontal axis of a graph indicates a loading point displacement δ [mm], and a vertical axis of the graph indicates a load F/Lt [$kN/mm^2$] per unit cross-sectional area, obtained by dividing a load F by a cross-sectional area Lt of the member. As illustrated in FIG. 9, in the example 1, the load level was confirmed to be higher than that of the comparative examples 1 and 2 over the entire crushing stroke. Concretely, $F_{ave}$/Lt [$kN/mm^2$] being an average of load under the displacement of 0 mm to 125 mm was 0.53 $kN/mm^2$ in the example 1, it was 0.44 $kN/mm^2$ in the comparative example 1, and it was 0.46 $kN/mm^2$ in the comparative example 2. Specifically, the example 1 was superior to the comparative examples 1 and 2 in terms of the balance between the impact absorbing performance and the lightness in weight (impact absorbing performance per weight).

Examples 2 and 3

The FEM analysis was performed to evaluate buckling deformation behavior. In examples 2 and 3, the buckling deformation behavior in the impact absorbing member having the first cross section illustrated in FIG. 8(*a*) was evaluated, in a similar manner to the example 1. The set conditions of the examples 2 and 3 are shown in Table 2.

TABLE 2

|  |  | EXAMPLE 2 | EXAMPLE 3 |
|---|---|---|---|
| RIDGE LINE | $\theta_1$ | 105, 110, 115, 120, 125, 130, 135 deg. | |
| ANGLE | $\theta_2 = 90 - (360 - 3\theta_1)$ | 45, 60, 75, 90, 105, 120, 135 deg. | |
| WIDTH OF | $Wp_1$ | 11 mm | 16 mm |
| PLANAR | $Wp_2$ | 9 mm | 14 mm |
| PORTION |  | | |
| CURVATURE RADIUS OF RIDGE LINE Rr |  | 5 mm | |
| SHEET THICKNESS t |  | 1.0 mm | |
| MATERIAL |  | 1180 MPa-CLASS | |
| LENGTH H |  | 200 mm | |
| COLLISION RATE |  | 5 m/s | |

[Evaluation]

Figure 10:
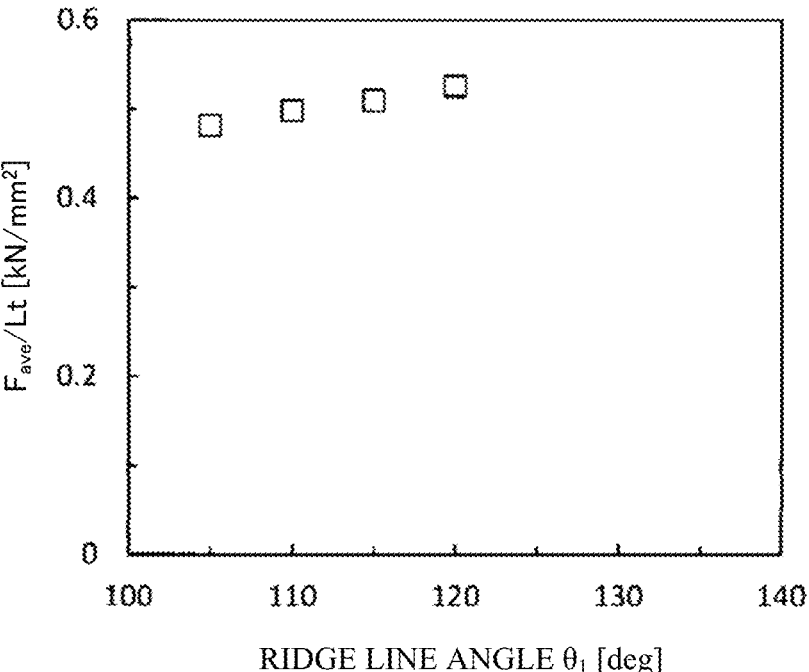
FIG. 10 is a result of FEM analysis in an example 2.
Figure 11:
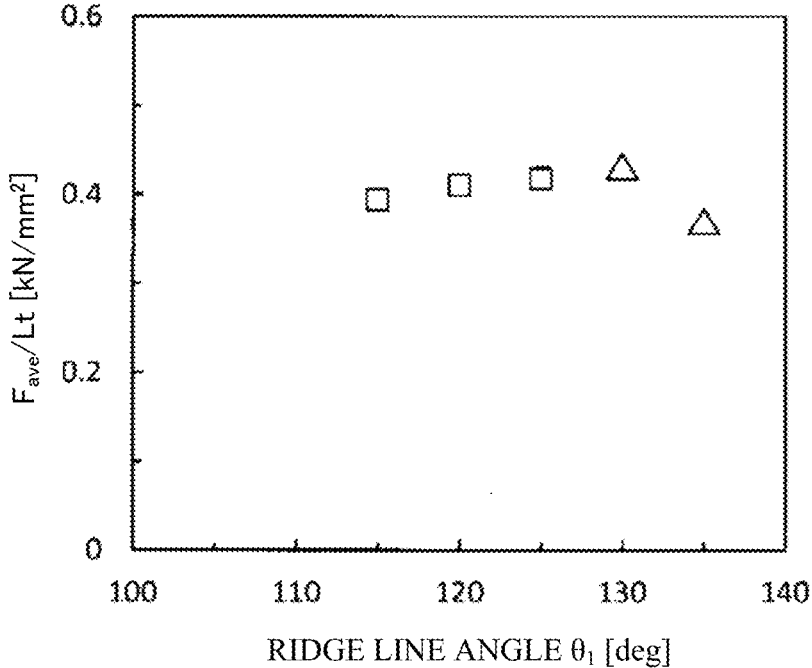
FIG. 11 is a result of FEM analysis in an example 3.
Figure 12:
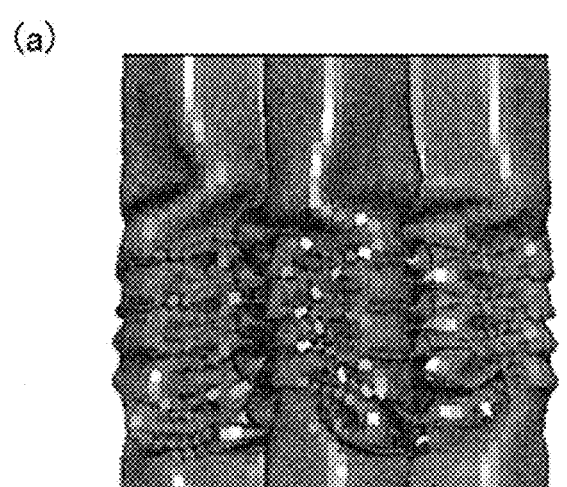
FIGS. 12(*a*) and 12(*b*) are schematic front views exemplifying buckling deformation modes.
Figure 12:
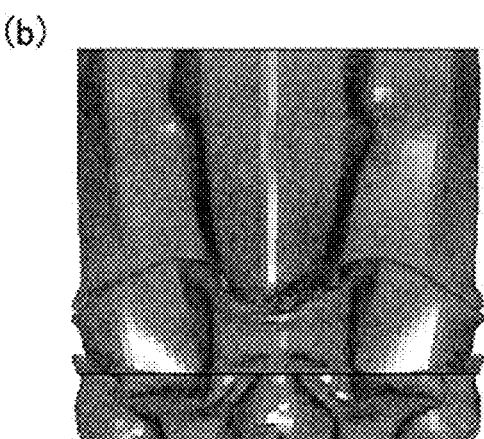

Results of the FEM analysis in the examples 2 and 3 are shown in FIG. and FIG. 11, respectively. As illustrated in FIG. 10 and FIG. 11, the larger the ridge line angle $\theta_1$ became, the better the value of $F_{ave}$/Lt was, until when the ridge line angle $\theta_1$ became 130°. Meanwhile, as illustrated in FIG. 11, when the ridge line angle $\theta_1$ was 135°, the value of $F_{ave}$/Lt became slightly small. Here, a quadrangular plot illustrated in FIG. 10 and FIG. 11 indicates a deformation mode (Type I) in which the buckling proceeded stably, as illustrated in FIG. 12(*a*). On the other hand, a triangular plot illustrated in FIG. 11 indicates a deformation mode (Unstable) in which the buckling proceeded unstably, as illustrated in FIG. 12(*b*). As illustrated in FIG. 11, when the ridge line angle $\theta_1$ is 130°, the deformation mode becomes Unstable, but the value of $F_{ave}$/Lt becomes the highest, and thus it is indicated that the ridge line angle $\theta_1$ is preferably 130° or less in particular.

Example 4

Figure 13:
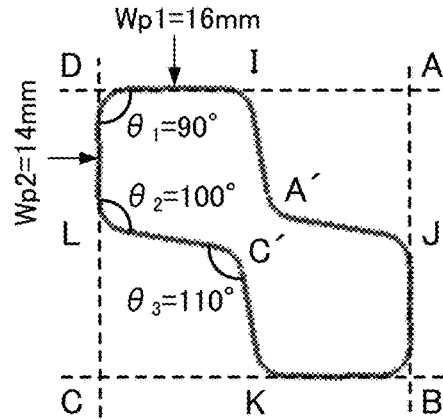
FIGS. 13(*a*) to 13(*c*) are schematic sectional views exemplifying impact absorbing members in examples 4 and 5, and a comparative example 3, respectively.
Figure 13:
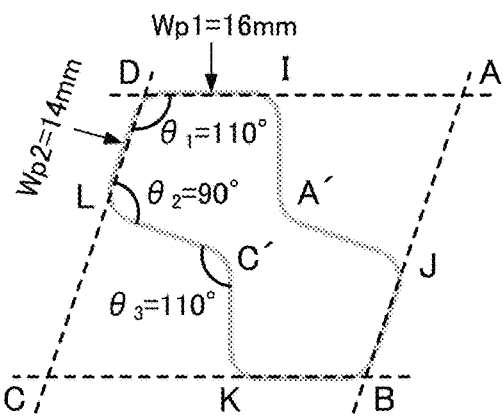
Figure 13:
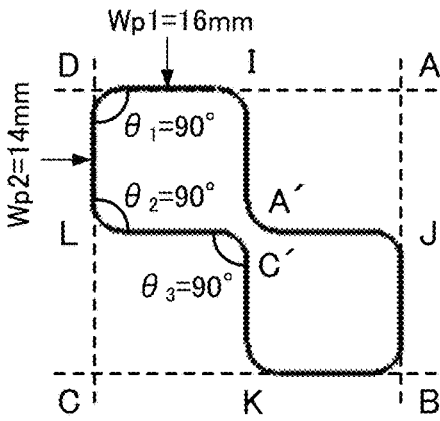

In an example 4, buckling deformation behavior in an impact absorbing member having a first cross section illustrated in FIG. 13(*a*) was evaluated. In the first cross section illustrated in FIG. 13(*a*), as a width Wp of a planar portion P, $Wp_1$ (16 mm) and $Wp_2$ (14 mm) were set. A second cross section is a quadrangle. Further, all interior angles (ridge line angles) of shared vertices B and D in the first cross section were set to $\theta_1=90°$, all interior angles (ridge line angles) of boundary vertices I, J, K, and L were set to $\theta_2=100°$, and all angles (ridge line angles) of bottom vertices A' and C' were set to $\theta_3=110°$. The other conditions were set in a similar manner to the example 1.

Example 5

In an example 5, buckling deformation behavior in an impact absorbing member having a first cross section illustrated in FIG. 13(*b*) was evaluated. In the first cross section illustrated in FIG. 13(*b*), as a width Wp of a planar portion P, $Wp_1$ (16 mm) and $Wp_2$ (14 mm) were set. A second cross section is a quadrangle. Further, all interior angles (ridge line angles) of shared vertices B and D in the first cross section were set to $\theta_1=110°$, all interior angles (ridge line angles) of boundary vertices I, J, K, and L were set to $\theta_2=90°$, and all angles (ridge line angles) of bottom vertices A' and C' were set to $\theta_3=110°$. The other conditions were set in a similar manner to the example 1.

Comparative Example 3

In a comparative example 3, buckling deformation behavior in an impact absorbing member having a first cross section illustrated in FIG. 13(c) was evaluated. In the first cross section illustrated in FIG. 13(c), as a width Wp of a planar portion P, $Wp_1$ (16 mm) and $Wp_2$ (14 mm) were set. A second cross section is a quadrangle. Further, all interior angles (ridge line angles) of shared vertices B and D in the first cross section, all interior angles (ridge line angles) of boundary vertices I, J, K, and L, and all angles (ridge line angles) of bottom vertices A' and C' were set to 110°. The other conditions were set in a similar manner to the example 1. The set conditions of the examples 4 and 5, and the comparative example 3 are shown in Table 1.

TABLE 3

|  |  | EXAMPLE 4 | EXAMPLE 5 | COMPARATIVE EXAMPLE 3 |
|---|---|---|---|---|
| RIDGE LINE | $\theta_1$ | 90 deg. | 110 deg. | 90 deg. |
| ANGLE | $\theta_2$ | 100 deg. | 90 deg. | 90 deg. |
|  | $\theta_3$ | 110 deg. | 110 deg. | 90 deg. |
| WIDTH OF | $Wp_1$ |  | 16 mm |  |
| PLANAR | $Wp_2$ |  | 14 mm |  |
| PORTION |  |  |  |  |
| CURVATURE RADIUS OF RIDGE LINE Rr |  |  | 5 mm |  |
| SHEET THICKNESS t |  |  | 1.0 mm |  |
| MATERIAL |  |  | 1180 MPa-CLASS |  |
| LENGTH H |  |  | 200 mm |  |
| COLLISION RATE |  |  | 5 m/s |  |

[Evaluation]

Figure 14:
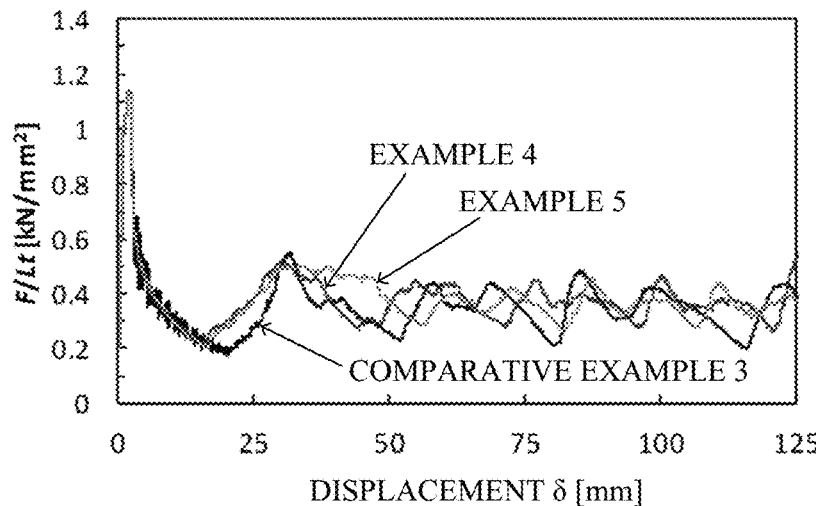
FIG. 14 is a result of FEM analysis in the examples 4 and 5, and the comparative example 3.

Results of the FEM analysis in the examples 4 and 5, and the comparative example 3 are shown in FIG. 14. As illustrated in FIG. 14, in the examples 4 and 5, the load level was confirmed to be higher than that of the comparative example 3 over the entire crushing stroke. Concretely, when attention is focused on $F_{ave}/Lt$ [kN/mm²] being an average of load under the displacement of 0 mm to 125 mm, $F_{ave}/Lt$ of each of the examples 4 and 5 was further improved by about 10% than that of the comparative example 3. Specifically, the examples 4 and 5 were superior to the comparative example 3 in terms of the balance between the impact absorbing performance and the lightness in weight (impact absorbing performance per weight).

EXPLANATION OF CODES

10 impact absorbing member
11 first cross section
12 second cross section
X recessed groove

The invention claimed is:

1. An impact absorbing member that absorbs an impact by being crushed in an axial direction, the impact absorbing member comprising a cylindrical shape extending along the axial direction, wherein:

when a cross section perpendicular to the axial direction of the impact absorbing member is set to a first cross section, and a cross section defined by extension lines of a plurality of sides in the first cross section is set to a second cross section, the second cross section is a polygon;

the first cross section includes a shared vertex that is shared by the second cross section, and a recessed groove that is positioned to correspond to a vertex of the second cross section; and an interior angle of at least one vertex of the first cross section is 100° or more, wherein the first cross section includes a plurality of the shared vertices and the recessed grooves, wherein the shared vertex and the recessed groove are alternately arranged along a peripheral direction of the first cross section, wherein lengths of adjacent two sides are different from each other in all adjacent sides of the first cross section, and wherein a non-planar portion is provided to make widths of adjacent planar portions have mutually different lengths.

2. The impact absorbing member according to claim 1, wherein:

each interior angle of less than 180° in the first cross section is 75° or more and 135° or less; and each angle of a bottom vertex in the recessed groove in the first cross section is 75° or more and 135° or less.

3. The impact absorbing member according to claim 1, wherein the first cross section does not have a flange portion.

4. The impact absorbing member according to claim 1, wherein the first cross section does not have a partition wall portion in the inside thereof.

5. An impact absorbing member that absorbs an impact by being crushed in an axial direction, the impact absorbing member comprising a cylindrical shape extending along the axial direction, wherein:

when a cross section perpendicular to the axial direction of the impact absorbing member is set to a first cross section, and a cross section defined by extension lines of a plurality of sides in the first cross section is set to a second cross section, the second cross section is a polygon;

the first cross section includes a shared vertex that is shared by the second cross section, and a recessed groove that is positioned to correspond to a vertex of the second cross section; and an interior angle of at least one vertex of the first cross section is 100° or more, wherein the first cross section includes a plurality of the shared vertices and the recessed grooves, wherein the shared vertex and the recessed groove are alternately arranged along a peripheral direction of the first cross section, wherein lengths of adjacent two sides are different from each other in all adjacent sides of the first cross section, wherein the first cross section includes a plurality of the shared vertices and the recessed grooves, wherein at least two of the recessed grooves are arranged at positions corresponding to respective vertices on the same diagonal line in the second cross section, and wherein the diagonal line is the longest diagonal line out of a plurality of diagonal lines extending from one vertex.

\* \* \* \* \*